US005731090A

United States Patent [19]
Chen

[11] Patent Number: 5,731,090
[45] Date of Patent: Mar. 24, 1998

[54] URETHANE LAMINATING ADHESIVES USEFUL FOR RETORT POUCHES

[75] Inventor: Mai Chen, Hoffman Estates, Ill.

[73] Assignee: Morton International, Inc., Chicago, Ill.

[21] Appl. No.: 681,577

[22] Filed: Jul. 29, 1996

[51] Int. Cl.$^6$ .......................... B32B 27/32; B32B 27/34; B32B 27/36; B32B 27/40

[52] U.S. Cl. .......................... 428/423.5; 428/423.7; 428/424.8; 525/440; 525/449; 525/453; 525/528

[58] Field of Search .......................... 428/423.1, 423.5, 428/423.7, 424.8, 474.7, 480, 523; 525/440, 449, 453, 528

[56] References Cited

U.S. PATENT DOCUMENTS

| | | | |
|---|---|---|---|
| 3,912,843 | 10/1975 | Brazier | 99/171 LP |
| 3,915,935 | 10/1975 | Abraham et al. | 260/75 NP |
| 4,503,189 | 3/1985 | Igarashi et al. | 525/104 |
| 4,843,119 | 6/1989 | Schapira et al. | 524/730 |
| 4,874,656 | 10/1989 | Rantanen | 428/216 |
| 5,202,391 | 4/1993 | Yamazaki et al. | 525/438 |

*Primary Examiner*—D. S. Nakarani
*Attorney, Agent, or Firm*—Wayne E. Nacker; Gerald K. White

[57] ABSTRACT

In a two-part, 100% solids adhesive composition useful for preparing a polymeric laminate adhesive pouch, a first part is a liquid OH-functional polyester containing epoxy resin having both epoxy and hydroxyl functionality and a second part is a multi-functional isocyanate.

12 Claims, No Drawings

URETHANE LAMINATING ADHESIVES USEFUL FOR RETORT POUCHES

The present invention is directed to a urethane laminating adhesive for adhering polymeric films that may be formed into retort pouches for food or medicinal applications.

BACKGROUND OF THE INVENTION

Retort pouches for sterilizing food or medicinal substances are typically formed of two (or more) layers of polymeric film. Typically, an inner layer is formed of a material, such as cast polypropylene, which is heat-sealable and food- or medicine-compatible. A second layer, such as polyester or polyamide, is typically adhered to the inner layer for packaging strength. In addition, such a second layer as the outer layer may be printed with suitable inks.

The present invention is directed to an adhesive composition suitable for use in adhering polymeric layers for food or medicinal retort pouches, which adhesive composition is free of or substantially free of organic solvents.

SUMMARY OF THE INVENTION

In accordance with the invention there is provided a two-part adhesive composition suitable for adhering polymeric layers to form laminates useful, for example, in forming retort pouches for food or medicinal applications. The two part adhesive composition comprises a first part I) having A) between about 50 and about 99 wt %, preferably between about 70 and about 90 wt %, based on total weight of A) plus B), of a hydroxyl-terminated polyester that is liquid at 20° C., the polyester having a hydroxyl functionality of between 2 and about 2.1 and a hydroxyl number of between about 50 and about 300, preferably between about 180 and about 250, B) between about 1 and about 50 wt %, preferably between about 10 and about 30 wt %, based on total weight of A) plus B) of an epoxy resin which is solid at 20° C. and is dissolved within said polyester A), the epoxy resin B) having an epoxy equivalent weight of between about 500 and about 3000 and a hydroxyl number of between about 100 and about 250, and C) up to about 0.05 wt %, preferably at least about 0.005 wt % relative to total weight of A) plus B), of an isocyanate cure catalyst. A second part II) comprises a multi-functional isocyanate having an isocyanate functionality of between 2 and about 4, preferably at least about 2.3. The second part II) is provided relative to the total hydroxyl functionality of A) plus B) at an NCO/OH ratio of between about 0.9 and about 3.0, preferably beetween about 1.05 and about 1.5.

DETAILED DESCRIPTION OF CERTAIN PREFERRED EMBODIMENTS

Polyesters useful in accordance with the present invention are liquid at room temperature, i.e., 20° C. Preferably, the polyesters have low viscosities, i.e., 500 cps or below at 20° C., so that the polyester A) and absorbed epoxy resin B) form a liquid composition at 20° C. that can be easily mixed with liquid polyisocyanate and applied as an adhesive layer to sheets of polymeric material. The polyester is linear or substantially linear, being formed primarily from dicarboxylic acids and diols. Diols are used in excess, whereby the polyester is OH-terminated. Aliphatic diols and dicarboxylic acids are preferred, although aromatic diols and dicarboxylic acids may also be used. In selection of diols and dicarboxylic acids for forming the polyester, consideration is given to compatibility with food and/or medicine. Suitable diols include, but are not limited to diethylene glycol, propylene glycol, ethylene glycol, hexane diol, butane diol, neopentyl glycol, etc. Suitable dicarboxylic acids include, but are not limited to adipic acid, terephthalic acid, isophthalic acid, sebacic acid, azelaic acid, etc. A slight amount of branching may be acceptable; thus, polyols, such as trimethylol propane, and polycarboxylic acids (and anhydrides), such as trimellitic anhydride, may be incorporated into the polyester chain. The hydroxyl functionality of the polyester provides the means by which the polyester is cross-linked with the polyisocyanate to form a cross-linked urethane. The polyester may have some acid functionality, i.e., up to an acid number of about 25, but no acid functionality is required or even desired. A currently preferred polymer is a copolymer of adipic acid and diethylene glycol having an OH number of about 210.

An important aspect of the composition of the present invention is the inclusion of the solid epoxy resin B) in the composition of the present invention. Particularly suitable epoxy resins are bisphenol A epoxy resins having both epoxy and hydroxyl functionality as described above. The OH functionality of the epoxy resin provides that the epoxy resin is cross-linked in the urethane curing reaction. The purpose served by the epoxy functionality of the epoxy resin is uncertain. While Applicants are not bound by theory, it is believed that the epoxy resin serves to bind to and "repair" breaks in the polyester chains which occur when the adhesive is subject to retort conditions. In any event, it is found that polyester A) and polyisocyanate part II) alone do not form an adhesive which adequately withstands retort conditions. Suitable bisphenol-A epoxy resins sold commercially by Shell Chemical Company are EPON® 1007F and 1002F.

Epoxy resins of this type are typically solid at 20° C.; however, they dissolve into the polyester at the relative use levels herein to form a liquid composition (Part I)). A typical temperature for dissolving the epoxy resin in the polyester is 100° C.

While adhesion will be obtained without a catalyst C), reasonably fast cure time generally requires a catalyst, such as dibutyltin dilaurate.

The polyfunctional isocyanate has a functionality of at least 2 and preferably somewhat higher, i.e., at least about 2.3 to provide good cross-link density upon curing. The polyfunctional isocyanate may be a monomer or mixture of monomers such as 4,4'-diphenylmethane diisocyanate, 4,2'-diphenylmethane diisocyanate, toluene diisocyanate, hexamethylene diisocyanate, isophoron diisocyanate, tetramethylxylene diisocyanate, etc. but preferably is polymeric, multi-functional isocyanate. A preferred multi-functional isocyanate is a trimer of hexane diisocyanate, the trimer having an isocyanate functionality of 3. Also suitable as multi-functional isocyanates are isocyanate-functional polymers, such as polyester urethanes and polyether urethanes. To facilitate mixing with part I), the multi-functional isocyanate must be liquid at 20° C.

Part II), the multi-functional isocyanate, is employed at least approximating and preferably in excess of the OH functionality of part I), including the polyester and the epoxy resin, i.e., at an NCO/OH ratio of between about 0.9 and about 3.0, preferably between about 1.05 and about 1.5, and most preferably between about 1.2 and about 1.4.

When parts I) and II) are mixed, curing begins immediately. Accordingly, the two parts are mixed at the point of application, typically within about 30 seconds of application of the mixture to one of the adhesive layers.

Laminates using the adhesive of the present invention are formed in a conventional manner. Typically, the two parts (I)

and II)) are mixed and the mixture applied as a layer to one sheet of polymeric material. Shortly thereafter, the two sheets are nipped together with heat, e.g., 66°–72° C., and pressure. An immediate bond is formed between the layers, although full cure takes place over a more extended period of time, e.g., a week. The fully cured adhesive will sustain a good bond between polymeric materials at typical retort conditions, e.g., 121° C. at 15 p.s.i. for an hour.

Neither part (I) or II)) requires any organic solvent; thus, 100% solids adhesive compositions are provided in accordance with the present invention. While organic solvents may be added in minor amounts, e.g., up to about 2 wt % total, for viscosity adjustment or other purposes, from a volatile organic content (VOC) standpoint, addition of organic solvent is considered undesirable.

The invention will now be described in greater detail by way of specific examples.

EXAMPLES 1 and 2

Adhesive compositions were (example 1 in accordance with the invention, example 2 comparative) formulated as follows (in wt %):

| Example | Polyester A* | Epoxy Resin** | HDI trimer |
|---|---|---|---|
| 1 | 40 | 10 | 50 |
| 2 | 50 |  | 50 |

*diethylene glycol adipate, OH no. 210
**Epon® 1002F

Each example also contained 0.007 wt % dibutyltin dilaurate. Each adhesive composition was used to form a laminate of nylon and cast polypropylene, and the laminate used to form a retort pouch.

Each pouch was filled with a 1:1:1 mixture of catchup/vinegar/corn oil, and the pouches were retorted at 121° C. at 15 p.s.i. for an hour. Results are as follows:

| Example | Appearance after retort | Bond strength after retort |
|---|---|---|
| 1 | no delaminating or tunneling | 1,160 g/in |
| 2 | blistering | 550 g/in. |

What is claimed is:

1. A 100 percent solids, two-part adhesive composition consisting essentially of
   I) a first part comprising
      A) between about 50 and about 99 wt %, based on total weight of A) plus B), of a hydroxyl terminated polyester; said polyester being liquid at 20° C., having a hydroxyl functionality of between 2 and 2.1, and a hydroxyl number of between about 50 and about 300,
      B) between about 1 and about 50 wt % of an epoxy resin based on total weight of A) plus B) which epoxy resin is solid at 20° C. and is dissolved within said polyester A), said epoxy resin B) having an epoxy equivalent weight of between about 500 and about 3000 and a hydroxyl number of between about 100 and about 250, and
      C) up to about 0.05 wt %, of an isocyanate cure catalyst relative to the weight of A) plus B), and
   II) a second part comprising a multi-functional isocyanate having an isocyanate functionality of between 2 and about 4, said second part II) being provided relative to the total hydroxyl functionality of A) plus B) at an NCO/OH ratio of between about 0.9 and about 3.0.

2. The adhesive composition according to claim 1 wherein said hydroxyl terminated polyester has an OH number between about 180 and about 250.

3. The adhesive composition according to claim 1 wherein said multifunctional isocyanate has an isocyanate functionality of at least 2.3.

4. The adhesive composition according to claim 1 wherein said catalyst C) is provided at at least about 0.005 wt % relative to the weight of A) plus B).

5. The adhesive composition according to claim 1 wherein said multi-functional isocyanate is a trimer of hexane diisocyanate.

6. The adhesive composition according to claim 1 wherein said polyester is a polymer of adipic acid and diethylene glycol.

7. The adhesive composition according to claim 1 wherein said NCO/OH ratio is from about 1.05 to about 1.5.

8. The adhesive composition according to claim 1 wherein said NCO/OH ratio is from about 1.2 to about 1.4.

9. The adhesive composition according to claim 1 wherein said first part I comprises from about 70 to about 90 wt % of said hydroxyl-terminated polyester A) and from about 10 to about 30 wt % of said epoxy B).

10. A laminate comprising a first polymeric layer and a second polymeric layer adhered with the adhesive composition of claim 1.

11. The laminate according to claim 10 wherein said first polymeric layer is polypropylene and said second polymeric layer is polyester.

12. The laminate according to claim 10 wherein said first polymeric layer is polypropylene and said second polymeric layer is polyamide.

* * * * *

UNITED STATES PATENT AND TRADEMARK OFFICE
CERTIFICATE OF CORRECTION

PATENT NO. : 5,731,090
DATED : March 24, 1998
INVENTOR(S) : Chen

It is certified that error appears in the above-indentified patent and that said Letters Patent is hereby corrected as shown below:

Column 4, line 26, delete "at" (first occurrence) and insert --in an amount-- therefor.

Signed and Sealed this

Fourth Day of August, 1998

Attest:

Attesting Officer

BRUCE LEHMAN

*Commissioner of Patents and Trademarks*